Patented Jan. 9, 1945

2,366,760

UNITED STATES PATENT OFFICE 2,366,760

PRODUCTION OF TROPINE

Jacob van de Kamp, Westfield, N. J., and Meyer Sletzinger, Bronx, N. Y., assignors to Merck & Co., Inc., Rahway, N. J., a corporation of New Jersey No Drawing. Application June 5, 1942,
Serial No. 445,988

4 Claims. (Cl. 260—292)

This invention relates to the preparation of tropine from tropinone.

Several methods have been proposed in the prior art for the reduction of tropinone to tropine, such as electrolytic reduction in acid or alkaline media, reduction with zinc dust and hydroiodic acid and similar procedures. However, such prior art methods yield products containing relatively large amounts of objectionable impurities, comprising among other products, pseudotropine and tropane (the oxygen-free base of tropine). Tropine is used in the synthesis of atropine, and when so used, the presence of appreciable amounts of the pseudo product causes difficulties in isolating a good yield of pure atropine or its salts. Methods for the purification of crude tropine give relatively poor yields and necessitate cumbersome and time-consuming procedures.

We have now discovered that by catalytic hydrogenation of a solution of tropinone in a suitable organic solvent and in the presence of a suitable hydrogenation catalyst, preferably of the metal type, a tropine is obtained which is characterized by a relatively low pseudotropine content. When operating within the preferred embodiment of our invention, the pseudotropine content may even be reduced to practically zero.

The organic solvent used in accordance with our invention may be any suitable solvent in which tropinone is soluble and which is substantially inert against tropinone or tropine, and against hydrogenation. It should be such that it may be evaporated in vacuo substantially without decomposing tropine dissolved therein. Preferably, the solvent should be a lower aliphatic alcohol. Within the preferred embodiment of our invention we use absolute ethanol.

The concentration of the tropine solution to be subjected to the hydrogenation procedure in accordance with our invention is not critical except that for practical reasons it is preferred to use concentrations between 5 and 15% tropinone in the solvent used.

The catalyst in accordance with the invention may be any suitable hydrogenation catalyst of the metal type. Within our preferred procedure we find it of advantage to use a nickel catalyst and preferably a Raney nickel catalyst. The catalyst is preferably finely dispersed throughout the tropinone solution. The same may be used either as such or adsorbed on a suitable carrier.

The hydrogenation is carried out by introducing hydrogen gas into the tropinone solution. For best results, it is of advantage to provide for the proper distribution of the hydrogen gas in the solution such as by agitation. Alternatively, the hydrogen may be brought to reaction with the tropinone solution in any other suitable manner well known in the hydrogenation art.

When operating within the preferred scope of the invention, the conversion of tropinone to tropine is substantially quantitative.

The following example illustrates a method of carrying out the present invention, but it is to be understood that this example is given by way of illustration and not of limitation.

Example

To 10 parts by weight of tropinone dissolved in 100 parts by volume of absolute ethanol is added 0.5 part by weight of Raney nickel catalyst. Hydrogen is then introduced into the solution at a pressure of a few inches of water, the temperature being maintained at about room temperature. The hydrogenation reaction is completed upon absorption of the calculated amount of hydrogen. The solution is then filtered from the catalyst and evaporated to dryness in vacuo. Tropine, in the form of white crystals M. P. 62° C., is obtained in substantially quantitative yield and the product is substantially free from isomeric pseudotropine.

The identity of the product was established through preparation of tropine picrate (M. P. 275°). Also, the product was condensed with tropic acid to form an addition product, tropine-tropate, of melting point 140–142° C. The tropine-tropate so prepared was identical with tropine-tropate prepared from tropine obtained by hydrolysis of atropine, and a mixed melting point determination of the two samples of tropine-tropate showed no depression.

Modifications may be made in carrying out the present invention, without departing from the spirit and scope thereof, and we are to be limited only by the appended claims.

We claim:

1. The process comprising hydrogenating tropinone, in organic solvent solution, in the presence of a nickel catalyst, and recovering tropine.

2. The process comprising hydrogenating tropinone, in organic solvent solution, and in the presence of Raney nickel, and recovering tropine.

3. The process comprising hydrogenating tropinone in ethanol solution, in the presence of a nickel catalyst, and recovering tropine.

4. The process comprising hydrogenating tropinone in ethanol solution, in the presence of Raney nickel, and recovering tropine.

JACOB van de KAMP.
MEYER SLETZINGER.